Jan. 19, 1954     W. J. STRONG ET AL     2,666,228
APPARATUS FOR STRIPPING MOLDED ARTICLES FROM MOLDS
Filed July 27, 1949     2 Sheets-Sheet 1

Inventors
Walter J. Strong
Robert E. Lindemann
By
Att'y

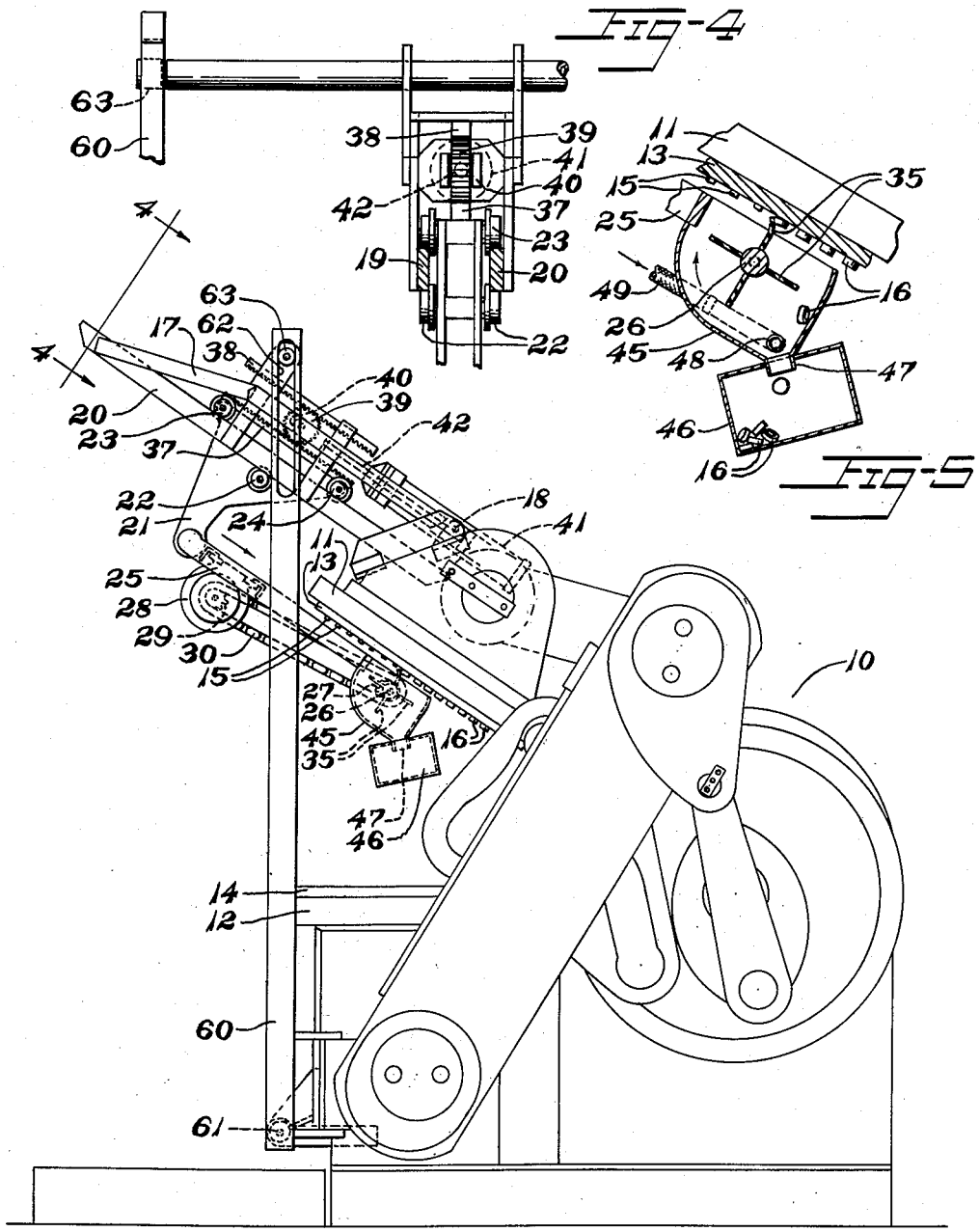

Patented Jan. 19, 1954

2,666,228

UNITED STATES PATENT OFFICE 2,666,228

APPARATUS FOR STRIPPING MOLDED ARTICLES FROM MOLDS

Walter J. Strong, Cuyahoga Falls, and Robert E. Lindemann, Leroy, Ohio, assignors to The B. F. Goodrich Company, New York, N. Y., a corporation of New York Application July 27, 1949, Serial No. 107,088

9 Claims. (Cl. 18—16)

This invention relates to apparatus for stripping molded articles from the molds in which they are formed and is especially useful in removing molded articles from the upper mold plate of molds mounted in presses, especially where the press is of the type having a tilting upper platen.

Small articles of rubber or other flexible material have been formed between mold plates providing a great many molding cavities therebetween for simultaneously forming a number of articles. The handling of such mold plates has been greatly facilitated by mounting them upon the platens of presses having a tilting top platen which exposes the upper plate for removal of finished articles between molding operations. However, even with such equipment it has been difficult to remove the finished articles rapidly from the mold plates.

It is an object of the present invention to provide for stripping or removal of articles from the mold by a brushing or prying action.

Other objects are to provide simultaneous removal of articles entirely across the face of the mold and progressively along the same, to provide for displacement of the stripping apparatus during closing of the press, and to collect the articles as they are dislodged.

These and other objects will appear from the following description and the accompanying drawings.

Of the drawings,

Fig. 3 is a view similar to Fig. 1 showing the press in the opened position.

Fig. 4 is a detail sectional view thereof, taken on line 4—4 of Fig. 3.

Fig. 5 is a detail sectional view thereof, taken on line 5—5 of Fig. 2.

Figures 1, 2:
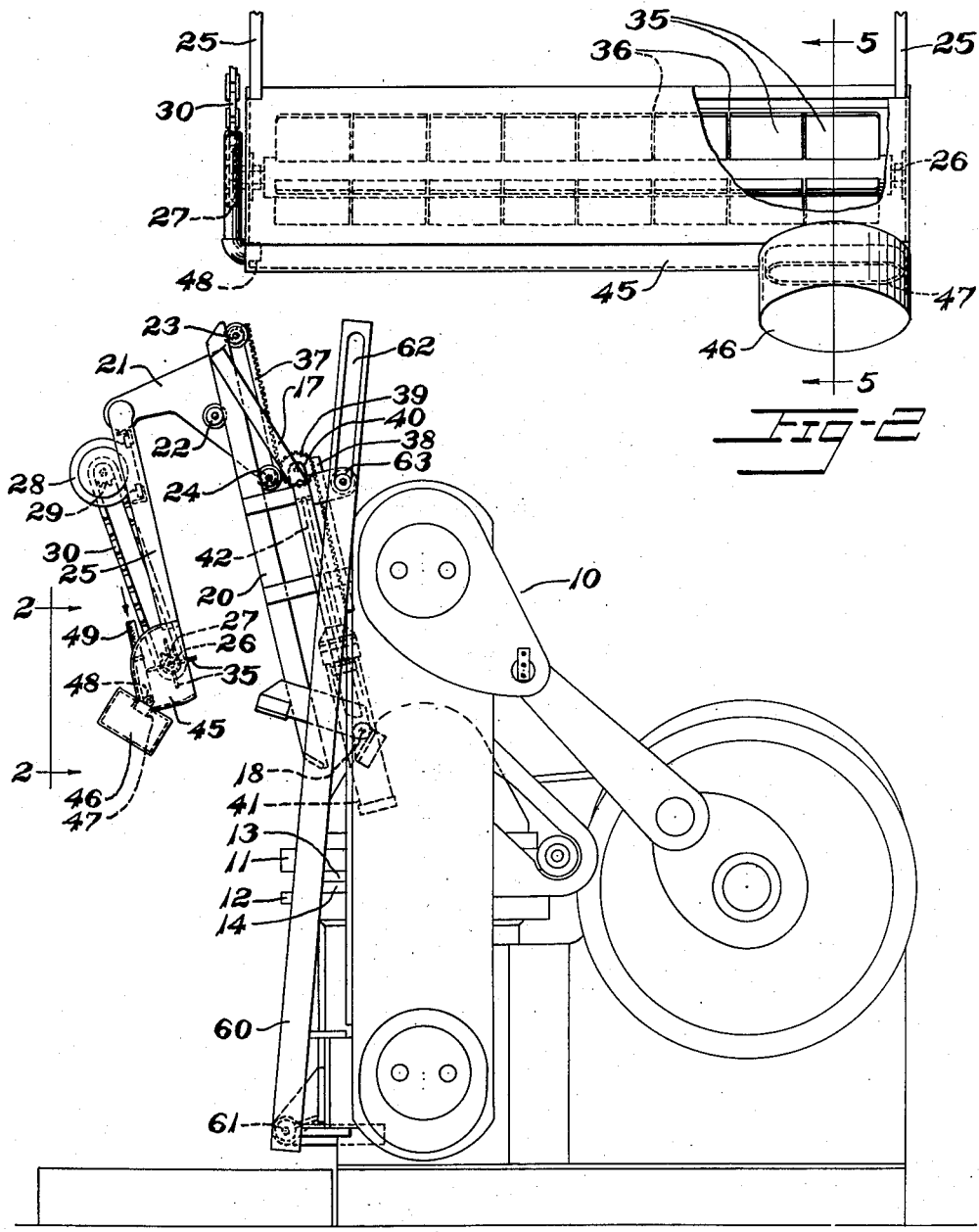
Fig. 1 is a side elevation of a molding press with apparatus constructed in accordance with the invention applied thereto, the press being illustrated in closed condition.
Fig. 2 is a detail view taken on line 2—2 of Fig. 1.

Referring to the drawings, the numeral 10 designates a molding press of a well known type having an upper platen 11 and a lower platen 12, the upper platen being adapted to be swung upwardly and tilted to the position illustrated in Fig. 3. A press of a type suitable for use with the present invention is shown and described for example in U. S. Patent No. 2,328,507 of August 31, 1943, although other presses may be used in conjunction with this invention.

Mounted respectively on the upper and lower platens are mold plates 13 and 14 having mating cavities. The upper mold plate has a multiplicity of cores or protuberances 15 for forming the hollow sides of cup-like rubber articles 16 while the lower plate has cavities for surrounding the cores and forming the outer surfaces.

In use of the molds the lower plate is lubricated as by a soap deposit so as readily to release the articles which are retained on the projecting cores 15 of the upper plate.

For removing the articles 16 from the upper plate, a swing frame 17 is pivotally secured, as at 18, to the upper platen of the press and has a pair of parallel guides 19, 20 fixed thereto. A carriage 21 is mounted for sliding movement along the guides and has wheels 22, 23, 24 engaging the guides to reduce friction. A pair of cantilever arms 25 of the carriage 21 extend parallel to the guide 20 and in the open position of the press 10 are parallel to the mold plate 13. Rotatably mounted on the ends of these arms and extending between them is a shaft 26 having a sprocket 27 secured thereto. An electric motor 28 is secured to arms 25 and has a sprocket 29 driving a chain 30 for driving shaft 26.

For frictionally contacting the articles 16 to remove them from the cores 15, a plurality of radially extending flexible vanes 35 are mounted at spaced intervals about shaft 26. These vanes are preferably of rubber and of such radial extent as to contact the upper mold plate 13. They extend entirely across the mold plate and preferably are divided at intervals, as at 36, for increased pliability and to insure contact with all the articles entirely across the mold plate.

For contacting all articles on the plate 13 progressively, the carriage 21 is moved along the guides 20, and for this purpose a rack 37 is fixed to carriage 21, a similar rack 38 is fixed to frame 17 and a pinion 39 meshing with both racks and between them is mounted on a cross head 40 for free rotation. A double acting fluid pressure operated cylinder 41 is mounted on frame 17 and its piston rod 42 is secured to the cross-head. The arrangement is such that movement of the cross head is multiplied, doubling movement of carriage 21. The arrangement is such that the rotating shaft 26 with its vanes 35 is moved across the face of the mold and dislodges the articles 16 from cores 15 progressively.

For collecting the articles, a trough 45 encloses the shaft 26 and its blades except where they engage the mold plate 13. A removable container 46 is secured to the trough at one end thereof about an outlet 47. An air jet 48 is mounted at the opposite end of the trough and is connected to a supply of compressed air by a flexible hose 49. The jet blows the discharged articles along the trough to the outlet where they fall into the container.

For swinging the stripping mechanism out of the way when the mold is being closed, a bar 60 has its lower end hingedly mounted, as at 61, to the stationary base of the press. Its upper end has an elongate slot 62. A roller 63 is mounted on the frame 17 and is engaged in the slot. The arrangement is such that when the press is opened, as in Fig. 3, the roller 63 is at the top of the slot and the bar 60 is subjected to tension, holding the frame 17 with its rails parallel to the mold plate 13; and when the press is closed, as in Fig. 1, roller 63 is at the lower end of slot 62 and bar 60 is subjected to longitudinal compression and holds the frame 17 in a near vertical position where it is out of the way.

In the operation of the apparatus, as the press is opened to the position of Fig. 3 after a molding operation, the frame 17 is rotated about pivot 18 to a position shown in Fig. 3 in which the rails 20 are parallel to mold plate 13. Motor 28 is then started to rotate shaft 26 in a clockwise direction and at the same time fluid under pressure is admitted to the rod end of cylinder 41 to move carriage 21 to the right in Fig. 3, moving shaft 26 from the front to the rear across mold plate 13. The flexible blades 35 contact the articles 16 and brush them from the cores 15 into the trough 45 where the jet 48 blows them into container 46. The control valve operating cylinder 41 is then reversed to apply fluid pressure to the head end of cylinder 41, moving shaft 26 forward of the press to its starting position.

While the cylinder 41 and motor 28 may be controlled by hand operated valves and switches respectively, it is preferred to operate them automatically by limit switches placed on the press and controlling solenoid operated valves and switches so that as the press is opened motor 28 starts automatically and runs until the press is closed and cylinder 41 is operated to reciprocate the carriage 21 when the press is opened.

Variations may be made without departing from the scope of the invention as it is defined by the following claims.

We claim:

1. Apparatus for stripping molded articles from the face of a mold, said apparatus comprising a rotatable body extending along the face of the mold and having flexible members for dislodging articles from the mold face, means for rotating said body about an axis parallel to said mold face, a guide positionable parallel to and along the mold face, and a carriage movable along said guide and supporting said rotatable body to engage said members with the articles and dislodge the same from the mold face and means for retracting the guide means, carriage and rotatable member from the mold face to permit closing of the mold.

2. Apparatus for stripping molded articles from the upper mold plate of a press, said apparatus comprising a guide movable to a position parallel to the face of the mold plate, a carriage movable along said guide, means for reciprocating said carriage along the guide, a rotatable body mounted on said carriage, said body having flexible members extending radially therefrom for dislodging articles from said mold plate, and means on said carriage for rotating said body.

3. Apparatus for stripping molded articles from the upper mold plate of a tilting top platen press, said apparatus comprising a guide movably mounted on the tilting upper platen of the press, said guide being movable from a position clearing the mold plate in the closed position of the press to a position parallel to the mold plate in the open position of the press, means controlled by movement of said platen for effecting such movement of said guide, a carriage movable along said guide across the face of said mold plate, means for so moving said carriage, and a rotatable stripping member on said carriage for dislodging articles from said plate.

4. Apparatus as defined by claim 3 in which said rotatable stripping member comprises a shaft having radial flexible blades.

5. Apparatus for stripping molded articles from a face of a mold mounted on a platen of a press, said apparatus comprising guide means movable into and out of opposed relation to the mold face, a carriage on said guide means, a member rotatable about an axis parallel to said mold face on said carriage having flexible blades extending radially therefrom for engaging the mold face, means for rotating said rotatable member, means for moving said carriage across the mold face, and means for retracting the guide means, carriage and rotatable member from the mold face to permit closing of the press.

6. Apparatus for stripping molded articles from a face of a mold mounted on a platen of a press, said apparatus comprising guide means pivotally mounted on the press and movable into and out of opposed relation to the mold face, a carriage mounted for movement across the mold face along said guide means, a member on said carriage rotatable about an axis parallel to said mold face and having flexible members extending radially therefrom for engaging the mold face, means for rotating said rotatable member, means for moving said carriage across the mold face, and means for swinging said guide means about its pivot for retracting the guide means, carriage and rotatable member from the mold face to permit closing of the press.

7. Apparatus for stripping molded articles from a mold face of a press, said apparatus comprising a rotatable body for dislodging articles from the mold face, means for rotating said body, radial projections on said body at spaced intervals thereabout for engaging the molded articles, means for moving said body across the mold face while said body is rotated to progressively contact the mold face to dislodge articles therefrom and means for retracting said body from the mold face to permit closing of the press.

8. Apparatus for stripping molded articles from the face of a mold, said apparatus comprising a rotatable body having projecting members for dislodging articles from the mold face, means for rotating said body about an axis parallel to said mold face means for moving said body along the mold face to engage said member with the articles and progressively dislodge them from the mold face, and means for retracting said body from the mold face to permit closing of the mold.

9. A molding press comprising a frame, fixed and movable platens thereon, a track mounted on said movable platen and movable relative thereto, a carriage on said track, a rotatable shaft on said carriage having resilient article-stripping projections, means for rotating said shaft, means for moving said carriage and shaft along said track, and means for operatively positioning said track relative to said movable platen when the latter is withdrawn from the fixed platen, the axis of shaft rotation being parallel to the face of said movable platen when the latter is withdrawn from said fixed platen, so that as said carriage is advanced along the track said projections are moved along the surface of said movable platen to strip molded articles from the platen.

WALTER J. STRONG.
ROBERT E. LINDEMANN.

References Cited in the file of this patent

UNITED STATES PATENTS

| Number | Name | Date |
|---|---|---|
| 2,116,916 | Van Hyning | May 10, 1938 |
| 2,225,672 | Webb | Dec. 24, 1940 |
| 2,226,326 | Scott | Dec. 24, 1940 |
| 2,394,260 | Pfeilsticker | Feb. 5, 1946 |
| 2,487,925 | Gronemeyer | Nov. 15, 1949 |